(12) United States Patent
Verthein et al.

(10) Patent No.: US 8,988,485 B2
(45) Date of Patent: Mar. 24, 2015

(54) DYNAMIC WIRELESS CONFIGURATION FOR VIDEO CONFERENCE ENVIRONMENTS

(71) Applicant: Microsoft Corporation, Redmond, WA (US)

(72) Inventors: William G. Verthein, Sammamish, WA (US); Amer A. Hassan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

(21) Appl. No.: 13/804,360

(22) Filed: Mar. 14, 2013

(65) Prior Publication Data

US 2014/0267558 A1 Sep. 18, 2014

(51) Int. Cl.
| | | |
|---|---|---|
| H04N 7/15 | (2006.01) | |
| H04L 12/18 | (2006.01) | |
| H04W 24/02 | (2009.01) | |
| H04W 84/18 | (2009.01) | |

(52) U.S. Cl.
CPC .............. *H04N 7/15* (2013.01); *H04L 12/1818* (2013.01); *H04W 24/02* (2013.01); *H04W 84/18* (2013.01)
USPC ................... 348/14.08; 348/14.09; 455/67.11

(58) Field of Classification Search
USPC .......... 348/14.01, 14.02, 14.08, 14.09, 14.12; 455/416, 422.1, 424, 426.1, 501, 503, 455/504, 63.1, 67.11, 67.13; 379/201.02, 379/201.12, 202.01
See application file for complete search history.

(56) References Cited

U.S. PATENT DOCUMENTS

| | | | |
|---|---|---|---|
| 7,415,117 B2 | 8/2008 | Tashev et al. | |
| 8,204,512 B2 * | 6/2012 | Dietrich et al. | ............ 455/456.2 |
| 8,270,597 B2 | 9/2012 | Downing et al. | |
| 8,300,080 B2 | 10/2012 | Cutler | |
| 8,320,244 B2 * | 11/2012 | Muqattash et al. | ........... 370/230 |
| 8,798,084 B2 * | 8/2014 | Pratt et al. | ..................... 370/406 |

(Continued)

FOREIGN PATENT DOCUMENTS

| | | |
|---|---|---|
| EP | 2203009 A1 | 6/2010 |
| EP | 2230009 A1 | 9/2010 |
| EP | 2230863 A2 | 9/2010 |

OTHER PUBLICATIONS

Demba E. Ba, et al.; "Enhanced MVDR Beamforming for Arrays of Directional Microphones;" IEEE International Conference on Multimedia and Expo; Jul. 2, 2007; pp. 1307-1310; http://ieeexplore.ieee.org/stamp/stamp.jsp?tp=&arnumber=4284898.

(Continued)

*Primary Examiner* — Binh Tieu
(74) *Attorney, Agent, or Firm* — Andrew Smith; Alin Corie; Micky Minhas

(57) ABSTRACT

Systems, methods, and software for facilitating wireless conference environments are disclosed. In an implementation, a media system obtains environment information comprising a physical characteristic of a conference environment in which to host a least a portion of a video conference. The media system also obtains schedule information comprising a schedule for a portion of a surrounding environment associated with the conference environment. The media system identifies a configuration in accordance with which to wirelessly exchange video with another media system or system s engaged in the video conference. The configuration is based at least in part on the physical characteristic of the conference environment and the schedule for the portion of the surrounding environment.

20 Claims, 6 Drawing Sheets

(56) References Cited

U.S. PATENT DOCUMENTS

| | | |
|---|---|---|
| 2006/0017805 A1 | 1/2006 | Rodman |
| 2008/0253341 A1 | 10/2008 | Cordeiro et al. |
| 2009/0210474 A1 | 8/2009 | Shao et al. |
| 2010/0142781 A1 | 6/2010 | Walker et al. |
| 2012/0014288 A1 | 1/2012 | Dore et al. |
| 2012/0224714 A1 | 9/2012 | Couse et al. |

OTHER PUBLICATIONS

"International Search Report & Written Opinion for PCT Patent Application No. PCT/US2014/020947", Mailed Date: Aug. 4, 2014, Filed Date: Mar. 6, 2014, 11 Pages.

4GON Solutions; "Factors Affecting Wireless Networking Performance;" Feb. 14, 2013; 3 pages; XP055160735; http://web.archive.org/web/20130214193514/http://www.4gon.co.uk/solutions/technical_factors_affecting_wireless_performance.php#usage.

* cited by examiner

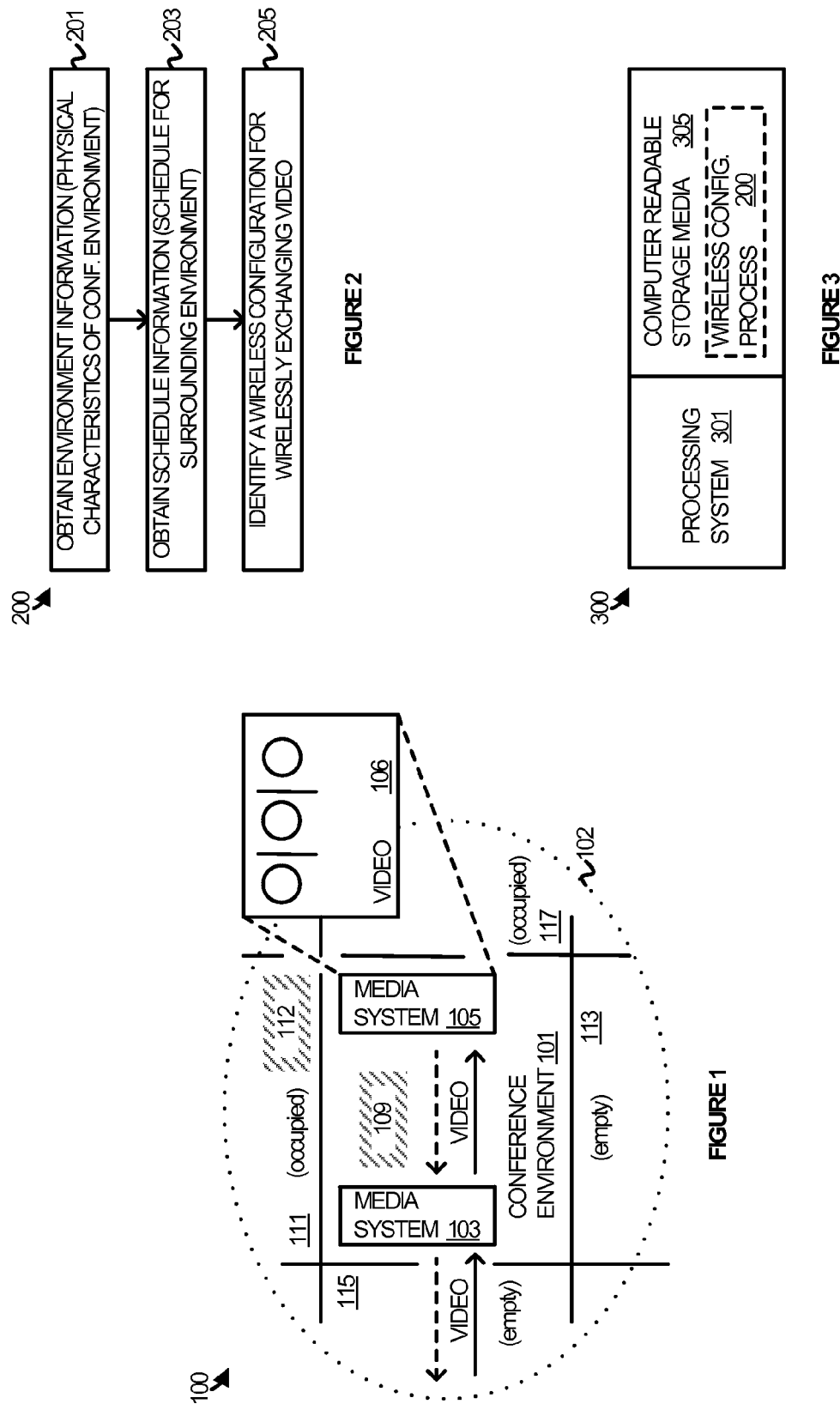

DYNAMIC WIRELESS CONFIGURATION FOR VIDEO CONFERENCE ENVIRONMENTS

TECHNICAL FIELD

Aspects of the disclosure are related to video conferencing technology, and in particular, to dynamically configuring the wireless exchange of video for video conferences.

TECHNICAL BACKGROUND

Video conferencing is becoming increasingly popular as the various technologies surrounding it develop. While in the past many hurdles existed to conveniently scheduling and hosting video conferences, today they can still be scheduled or even initiated with little notice and involve people from almost anywhere. The reliability and reach of communication networks, easy-to-use conferencing software, and the processing power of modern communication devices are just some examples of how technology now generally supports the routine adoption and deployment of video conferencing.

Within the conference room, many technologies have developed that provide almost life-like interaction between participants in a video conference. If anything, the video conference experience has become closer to an in-person experience than ever before. Many conference rooms are now outfitted with high-definition video systems capable of displaying video captured of remote scenes with such detail and fidelity that local participants and remote participants alike can interact almost as if they are physically present together.

At the same time, inter-device communication has advanced to such a degree that complex and expensive wiring may no longer be needed within a conference room to the same degree as in the past. Some media devices employed in conference environments have wireless capabilities allowing them to transmit or receive video wirelessly so as to avoid the bundle of wires that normally connect such equipment. Such arrangements not only simplify setup of video conferences, but also reduce the cost of building or retrofitting rooms.

For example, many conference environments include display systems having wireless capability. This allows a central media system to wirelessly transmit incoming video directly to a display system for display to local participants in a video conference. In some cases there may be multiple display systems in a room that each receive and display a video feed provided wirelessly by the media system. Many video capture devices are also capable of wirelessly communicating video to other elements within a conference environment which may, in turn, distribute the video for consumption by remote conference participants.

Overview

Provided herein are systems, methods, and software for facilitating wireless conference environments. In an implementation, environment information is obtained that comprises a physical characteristic of a conference environment in which to host a least a portion of a video conference. Schedule information is also obtained that comprises a schedule for a portion of a surrounding environment associated with the conference environment. A wireless configuration is identified in accordance with which to wirelessly exchange video between media systems engaged in the video conference. The configuration is based at least in part on the physical characteristic of the conference environment and the schedule for the portion of the surrounding environment. In some implementations the configuration may reduce, avoid, or mitigate interference associated with the physical characteristic and to reduce other interference implied by the schedule.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates a conference architecture in an implementation.

FIG. 2 illustrates a wireless configuration process in an implementation.

FIG. 3 illustrates a computing architecture in an implementation.

TECHNICAL DISCLOSURE

Figure 4:
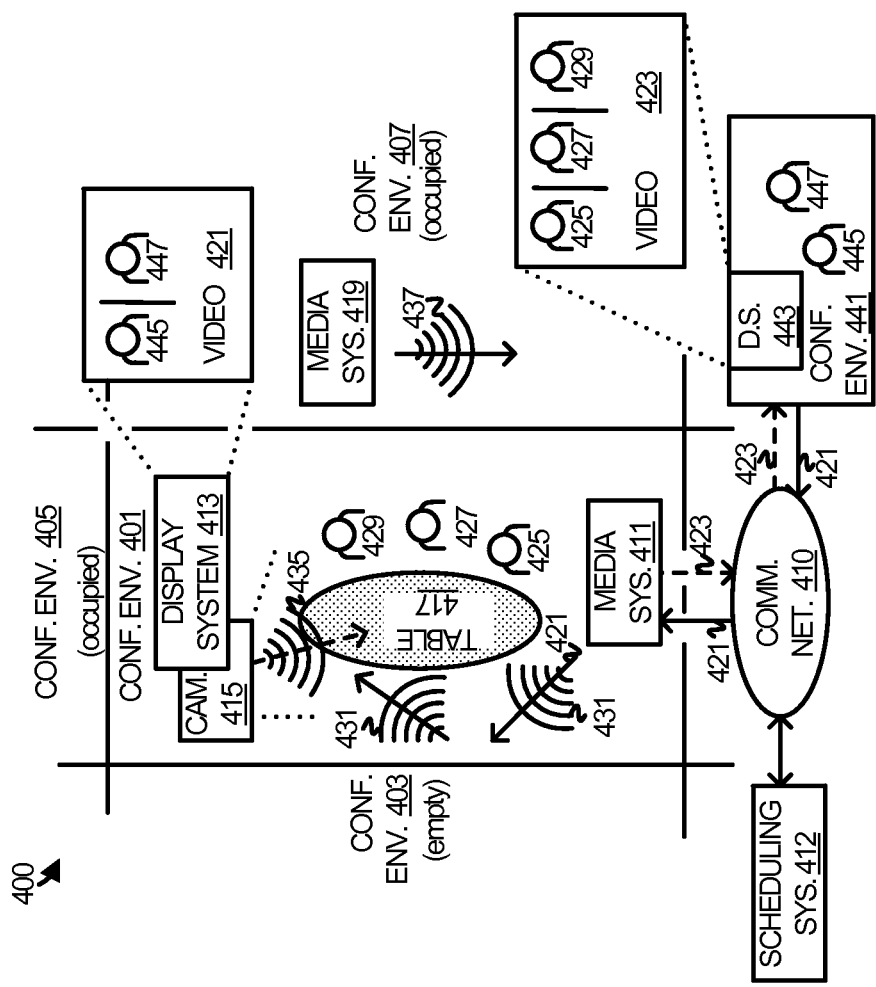
FIG. 4 illustrates a conference architecture in an implementation.

Implementations disclosed herein provide for improved video conferences whereby at least a portion of the video exchanged during a conference is done so wirelessly in a manner that attempts to mitigate interference with other wireless communications that may be ongoing in the vicinity of the video conferences. In some situations, multiple conference rooms or other suitable conference environments might be situated in an arrangement that is susceptible to interference. For example, one conference room may be directly adjacent to another or multiple other rooms. Wireless signals exchanged within the context of a video conference may be configured in particular ways to limit interference. For example, appropriate signal shapes, signal direction, power levels, and transmission protocols may be selected to mitigate interference encountered within or nearby a conference environment. Various types of information, such as the presence of objects in a room or the schedules of adjacent rooms may be considered when selecting the configuration.

In some implementations environment information is obtained that relates to a physical characteristic of a conference environment in which a least a portion of a video conference is hosted. Schedule information may also be obtained that relates to a schedule for a portion of a surrounding environment associated with the conference environment. A wireless configuration, in accordance with which to wirelessly exchange video between media systems engaged in the video conference, may then be identified based at least in part on the physical characteristic of the conference environment and the schedule for the portion of the surrounding environment. The wireless configuration may reduce interference associated with the physical characteristic and other interference implied by the schedule.

In various scenarios the conference environment may include, but is not limited to, a first media system and a media video system and the video includes first video captured of a first scene. In such scenarios the wireless configuration may relate to a protocol, a shape, a direction, and/or a power level for a first wireless signal that carries the first video from the first video system to the second video system. In some instances at least one of the protocol, the shape, the direction, and the power level for the first wireless signal is selected so as to reduce the interference associated with the physical characteristic and to reduce other wireless interference implied by the schedule.

Some scenarios involve a third media system and the video further includes second video captured by the third video system of a second scene. In such a case, the wireless configuration may relate to any or all of a protocol, a shape, a direction, and a power level for a second wireless signal that carries the second video from the third video system to the first video system. In addition, the protocol, the shape, the direction, and the power level for the second wireless signal may be selected in order to reduce the wireless interference associated with the physical characteristic, the other wireless interference implied by the schedule for the portion of the surrounding environment, and additional interference associated with the first wireless signal.

Some implementations provide for analyzing at least a portion of the video to detect a presence of any objects in the conference environment having a potential to interfere with the video wirelessly exchanged between the media systems. In addition, the physical characteristic in some cases may relate to the presence of at least one of the objects.

Referring now to the drawings, FIG. 1 illustrates conference architecture 100 in an implementation. Conference architecture 100 includes conference environment 101 and surrounding environment 102. Conference environment 101 is representative of any area or space within which a video conference or a portion thereof may be hosted, such as a conference room, an office, or a presentation hall, as well as any other suitable environment. Surrounding environment 102 is representative of any environment or collection of environments that may be proximate to conference environment 101, such as another conference room or collection of conference rooms.

Conference environment 101 includes media system 103 and media system 105 although it may be appreciated that additional media systems may be included. Media system 103 and media system 105 may operate in cooperation to facilitate the video conference. Surrounding environment 102 has several portions or sub-environments represented by sub-environment 111, sub-environment 113, sub-environment 115, and sub-environment 117.

In operation, a video conference or a portion thereof may be hosted within conference environment 101. Video 106 captured of a scene remote from conference environment 101 may be received by media system 103 and wireless communicated to media system 105 for display to the local participants. In some scenarios, video may also be captured of the local scene within conference environment 101 and communicated by media system 103 for presentation to the remote participants.

Various characteristics of conference environment 101 may impede the wireless transmission of video 106 from media system 103 to media system 105. For example, various objects may be present within conference environment 101 that have a potential to cause interference with wireless signals, represented by interference 109. Interference 109 may be caused by any type of object, such as people, equipment, and décor, as well as any other type of object that may have the potential for wireless interference.

In addition, the operations carried out within conference environment 101 may impede the exchange of wireless video or other wireless communications within any of the sub-environments of surrounding environment 102. For example, a wireless signal transmitted by media system 103 or media system 105 may cause interference in one or more of the sub-environments, as represented by interference 112 in sub-environment 111.

In order to mitigate the effects of interference 109 and possibly avoid or mitigate interference 112, media system 103 may employ wireless configuration process 200, illustrated in FIG. 2, before or during a video conference. Referring now to FIG. 2, the operations of which are indicated parenthetically, media system 103 may obtain environment information that indicates or pertains to a physical characteristic of characteristics of conference environment 101 (step 201). Examples of a physical characteristic include the presence of objects, the layout of furniture or other décor, the nature or identity of materials used within a room, the nature or identity of materials used to make the walls, ceiling or floor of a room, and the distance between transmitting and receiving equipment, as well as any other characteristic that may describe a physical aspect of a conference environment.

Media system 103 may also obtain schedule information that identifies or pertains to a schedule or schedules for any of the sub-environments of surrounding environment 102 (step 203). The schedule or schedules may indicate whether or not any of the sub-environments is or will be occupied during the video conference. In some scenarios, the schedule may also indicate whether or not wireless communications will be in use in any of the sub-environments during the video conference.

Media system 105 may then identity a suitable wireless configuration for wirelessly exchanging video between media system 103 and media system 105 based on the environment information and the schedule information (step 205). The wireless configuration arrived at by media system 105 may be selected so as to avoid or reduce interference 109 and interference 112. For example, any or all of the shape, signal, the power level, and the direction of a wireless signal transmitted by media system 103 and carrying video 106 may be selected, modified, or otherwise determined such that interference 109 and interference 112 are avoided or at least mitigated. Other wireless configuration aspects may also be considered in view of the environment information and the schedule information, such as the wireless protocol, frequency, or antenna scheme employed.

Referring still to FIG. 1 for an illustrative example, sub-environment 113 is empty, as may be indicated by a schedule, while sub-environment 111 and sub-environment 117 are determined to be occupied during the video conference hosted in conference environment 101. To avoid interference 112, media system 103 may determine to direct a wireless signal away from sub-environment 111. This may be accomplished in a number of ways, such as simply blocking a portion of the wireless signal, shaping the wireless signal, or in some other suitable manner. To avoid causing interference in sub-environment 117, media system 103 may determine to limit the power of the wireless signal to reduce the likelihood that a portion of the signal sufficient to cause interference reaches sub-environment 117.

Within conference environment 101, media system 103 may direct the wireless signal to avoid interference 109 potentially caused by an object or objects present during all or portions of the video conference. Other configurations may include shaping the wireless signal so that all or most of the signal avoids the object or objects causing interference 109.

In some scenarios, media system 103 may continuously, periodically, or on some other basis monitor for the movement or presence of, or changes to, objects within conference environment 101 in order to update the wireless configuration. In addition, media system 103 may continuously, periodically, or on some other basis monitor for changes to the schedule or schedules of any or all of the sub-environments within surrounding environment 102. Media system 103 may update the wireless configuration accordingly in view of any of these changes in order to maintain high quality video while attempting to mitigate the effect of wireless communications on surrounding environment 102.

FIG. 3 illustrates a computing architecture 300 that may be employed to carry out at least wireless configuration process 200. Computing architecture 200 includes processing system 301 and computer readable storage media 305. Various elements within configuration architecture 100, such as media system 103, may have computing architecture 300 embodied therein such that the element is capable of performing wireless configuration process 200. Processing system 301 is operatively coupled with computer readable storage media 305. Processing system 301 loads and executes software from computer readable storage media 305. When executed by processing system 301, the software directs processing system 301 to operate as described herein for wireless configuration process 200 or its variations.

Referring still to FIG. 3, processing system 301 may comprise a microprocessor and other circuitry that retrieves and executes software from computer readable storage media 305. Processing system 301 may be implemented within a single processing device but may also be distributed across multiple processing devices or sub-systems that cooperate in executing program instructions. Examples of processing system 301 include general purpose central processing units, application specific processors, and logic devices, as well as any other type of processing device, combinations, or variations.

Computer readable storage media 305 may be readable by processing system 301 and capable of storing the software in which wireless configuration process 200 may be implemented. Computer readable storage media 305 may include volatile and nonvolatile, removable and non-removable media implemented in any method or technology for storage of information, such as computer readable instructions, data structures, program modules, or other data. Examples of computer readable storage media 305 include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is computer readable storage media 305 a propagated signal. In addition to computer readable storage media 305, in some implementations computing architecture 300 may also include communication media over which software may be communicated internally or externally.

FIG. 4 illustrates conference architecture 400 in an implementation. Conference architecture 400 includes conference environment 401 surrounded in various ways by other conference environments, conference environment 403, conference environment 405, and conference environment 407. Each of the other conference environments may be adjacent to conference environment 401, such as next to, above, or below it, or otherwise considered proximate.

Conference environment 401 includes media system 411, scheduling system 412, display system 413, camera 415, and table 417. Additional elements, such as additional display systems, are possible and may be considered within the scope of the present disclosure.

Media system 411 may be any system or collection of systems capable of participating in a video conference, such as wireless enabled computer capable of sending and receiving video. Scheduling system 412 may be any system or collection of systems capable of providing scheduling information to media system 411 pertaining to the occupancy of other conference environments. Display system 413 may be any system or collection of systems capable of displaying video transmitted by media system 411. Examples of display system 413 include wireless high definition television sets, wireless high definition monitors, or any other type of system capable of wirelessly receiving video and displaying the video. Camera 415 may be any system or collection of systems capable of capturing video and transmitting the video to media system 411. Camera 415 may be integrated with display system 413 or may be a stand-alone component capable of operating independently.

The other conference environments may also include various types of equipment and other objects similar to those found in conference environment 401 that allow for the hosting of video conferences or other conferences. For example, conference environment 401 includes media system 419.

In operation, a video conference or a portion thereof may be hosted within conference environment 401. In this implementation, a local portion of the video conference involves various people, participant 425, participant 427, and participant 429, gathered around table 417. A remote portion of the video conference is held in conference environment 441 and includes participant 445 and participant 447. Video 421 captured of the scene remote from conference environment 401 may be received by media system 411 for wireless distribution to and display by display system 413.

Camera 415 may also capture video 423 of the local scene, including images of participant 425, participant 427, and participant 429. Camera 415 wirelessly communicates the captured video to media system 411, which in turn communicates video 423 via communication network 410 to conference environment 441. Display system 443 within conference environment can then display video 423 to the local participants.

Various characteristics of conference environment 401 may impede the wireless transmission of video 421 from media system 411 to display system 413. For example, various objects may be present within conference environment 401 that have a potential to cause interference with wireless signal 431 that carries video 421. Various objects may also be present that have a potential to cause interference with wireless signal 435 that carries video 423 captured by camera 415. In particular, the presence of people or their particular position with a room may impede the exchange of wireless signals. Other characteristics of conference environment 401 may also have the potential to cause interference, such as other objects, equipment, and décor.

Moreover, the operations carried out within conference environment 401 may impede the exchange of wireless video or other wireless communications within any of the other conference environments in conference architecture 400. For example, a wireless signal transmitted by media system 411 or display system 413 may cause interference in one or more of the other conference environments.

Figure 6:
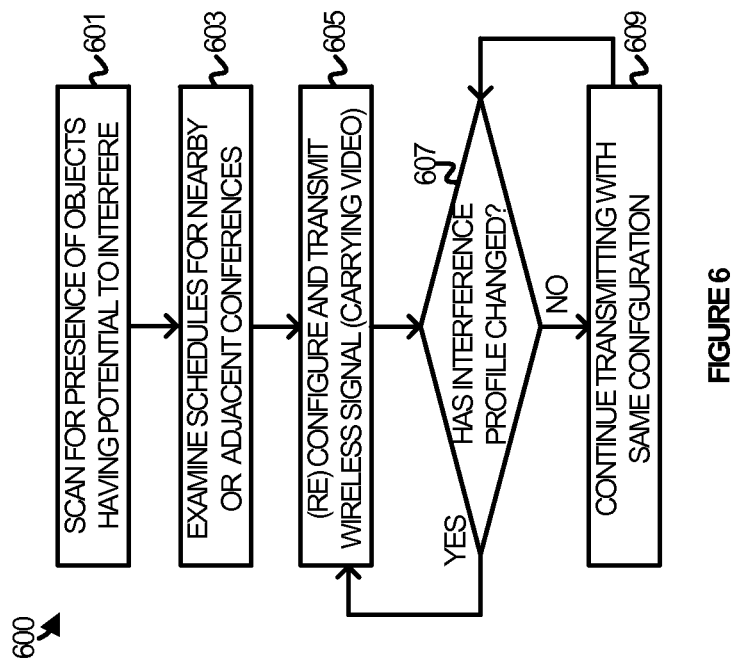
FIG. 6 illustrates a wireless configuration process in an implementation.

In order to avoid or mitigate the effects of such interference, media system 103 may employ wireless configuration process 600, illustrated in FIG. 6, or any combination or variation thereof, before or during a video conference. Referring now to FIG. 6, the operations of which are indicated parenthetically, media system 411 may obtain environment information that indicates or pertains to a physical characteristic of characteristics of conference environment 401 by scanning for the presence of objects having the potential to interfere (step 601). Examples of scanning include analyze test or preparation video to identify objects in a room prior to or at the beginning of a video conference. The video may be analyzed using various video analytics techniques capable of detecting the presence of people in a room. The video may be compared against earlier video or layout information that describes what other inanimate objects may generally be in the room, such as chairs, a table, white boards, and other furniture. It may be appreciated that a variety of techniques for scanning and identifying objects within an environment are possible and may be considered within the scope of the present disclosure.

Other characteristics that may be considered in addition to the presence of objects include the layout of furniture or other décor, the nature or identity of materials used within a room, the nature or identity of materials used to make the walls, ceiling or floor of a room, and the distance between transmitting and receiving equipment, as well as any other characteristic that may describe a physical aspect of a conference environment.

Media system 411 may also obtain schedule information from media system 412 that identifies or pertains to a schedule or schedules for any of the other conference environments within conference architecture 400 (step 603). The schedule or schedules for nearby of adjacent rooms may indicate whether or not any of the other conference environments is or will be occupied during the video conference. In some scenarios, the schedule may also indicate whether or not wireless communications will be in use in any of the sub-environments during the video conference. It is assumed here for illustrative purposes that conference environment 403 is empty, conference environment 405 is occupied, and conference environment 407 is occupied.

Media system 411 may then identify a suitable wireless configuration for wirelessly exchanging video between media system 411 and display system 413 based on the environment information and the schedule information (step 605). The wireless configuration arrived at by media system 411 may be selected so as to avoid or reduce interference caused by any of the local participants, equipment in the room, or other characteristics of conference environment 401. The wireless configuration may also be selected so as to avoid causing interference with respect to communications occurring in other conference environments, such as conference environment 407.

For example, any or all of the shape, signal, the power level, and the direction of wireless signal 431 transmitted by media system 411 and carrying video 421 may be determined to avoid or mitigate interference within or external to conference environment 401. To avoid interference, media system 411 may determine to direct a wireless signal away from occupied environments or interference causing objects. This may be accomplished in a number of ways, such as simply blocking a portion of the wireless signal, shaping the wireless signal, or in some other suitable manner. The power of wireless signal 431 may also be adjusted to avoid or mitigate interference.

Upon identifying a configuration for wireless signal 431, media system 411 transmits wireless signal 431 to display system 413 (step 605). In the implementation illustrated in FIG. 4, wireless signal 431 is directed away from conference environment 407, which is occupied, and toward conference environment 403, which is empty. This is to avoid or at least mitigate interference with wireless signal 437 generated by media system 419 and to avoid any interference that may arise from the position of the local participants in conference environment 401. The direction of wireless signal 431 in FIG. 4 is provided merely for illustrative purposes and may be exaggerated or different relative to how a wireless signal may actually be directed. In this implementation, directing wireless signal 431 towards conference environment 403 allows it to bounce or otherwise be redirected off a wall or some other structure so that a sufficient amount of its energy reaches display system 413. Display system 413 then processes wireless signal 431 so as to display video 421.

Other wireless configuration aspects may also be considered in view of the environment information and the schedule information, such as the wireless protocol, frequency, or antenna scheme employed. It may also be appreciated that other characteristics of wireless signal 431, in place of or in addition to its direction, may be included in its wireless configuration. For example, the power of wireless signal 431 may be adjusted to reduce the likelihood that it causes interference with other signals in conference environment 405, which is occupied. Other features of wireless signal 431, such as its beam-width may also be adjusted. These adjustments may be made with respect to the horizontal or vertical plane of wireless signal 431, or any combination or variation thereof. In some scenarios, changing the direction of wireless signal 431 may be accomplished by modifying transmission characteristics, but may also be accomplished by mechanical means, such as by rotating an antenna in one direction or another, or in some other manner maneuvering transmission equipment to effectively change a characteristic of wireless signal 431.

Referring still to FIG. 6, upon identifying a configuration and commencing with the transmission of video, media system 411 monitors for changes to the interference profile of the video conference (step 607). A variety of changes may occur, such as the repositioning of participants within conference environment 401, the cessation of a conference in an adjacent environment, the launch of a new conference in an adjacent environment, or any other change that may add to or detract from the potential for interference. In the event that changes have occurred with respect to the interference profile, the configuration of wireless signal 431 and possibly wireless signal 435 may be changed (return to step 605). For example, a reduction in the potential for interference can lead to a change in the configuration of the wireless signals. Conversely, an increase in the potential for interference can lead to yet another change in the configuration of the wireless signals. In the event that no change has occurred, media system 411 continues to transmit in accordance with the wireless configuration (step 609).

Figure 7:
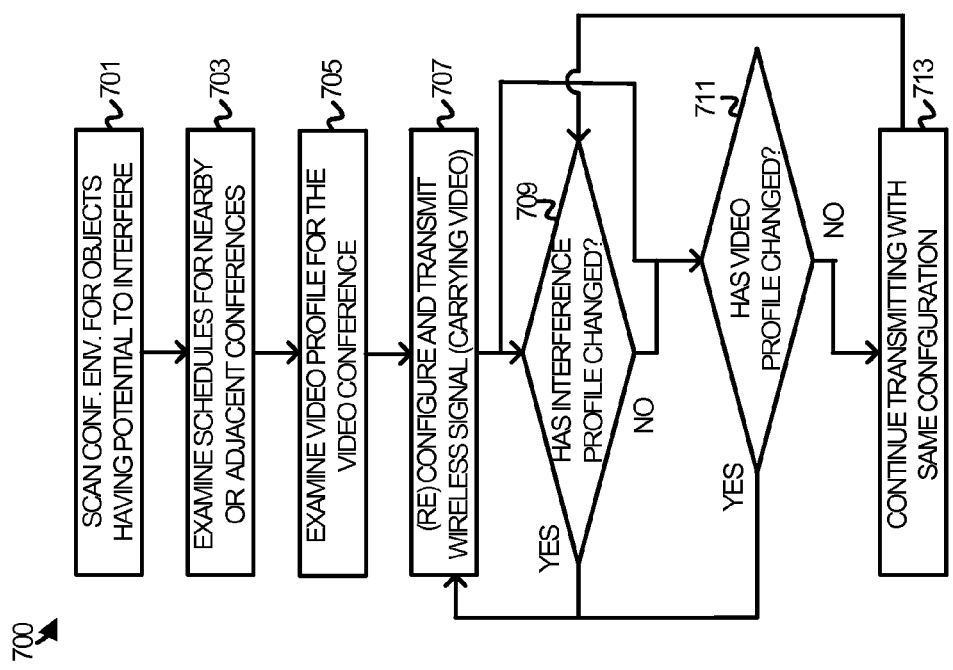
FIG. 7 illustrates a wireless configuration process in an implementation.

In some implementations, media system 411 may employ wireless configuration process 700, or any combination or variation thereof, before or during a video conference. Referring now to FIG. 7, the operations of which are indicated parenthetically, media system 411 may obtain environment information that indicates or pertains to a physical characteristic of characteristics of conference environment 401 by scanning for the presence of objects having the potential to interfere (step 701). Examples of scanning include analyzing test or preparation video to identify objects in a room prior to or at the beginning of a video conference. The video may be analyzed using various video analytics techniques capable of detecting the presence of people in a room. The video may be compared against earlier video or layout information that describes what other inanimate objects may generally be in the room, such as chairs, a table, white boards, and other furniture. It may be appreciated that a variety of techniques for scanning and identifying objects within an environment are possible and may be considered within the scope of the present disclosure.

Other characteristics that may be considered in addition to the presence of objects include the layout of furniture or other décor, the nature or identity of materials used within a room, the nature or identity of materials used to make the walls, ceiling or floor of a room, and the distance between transmitting and receiving equipment, as well as any other characteristic that may describe a physical aspect of a conference environment.

Media system 411 may also obtain schedule information that identifies or pertains to a schedule or schedules for any of the other conference environments within conference architecture 400 (step 703). The schedule or schedules for nearby of adjacent rooms may indicate whether or not any of the other conference environments is or will be occupied during the video conference. In some scenarios, the schedule may also indicate whether or not wireless communications will be in use in any of the sub-environments during the video conference. It is assumed here for illustrative purposes that conference environment 403 is empty, conference environment 405 is occupied, and conference environment 407 is occupied.

The video profile for the video conference may also be examined (step 705) that describes the nature of the video that may be captured remotely and communicated for display within conference environment 401. For example, the video profile may indicate that the video conference will include an amount of motion lower or higher than normal, or it may contain a normal amount of motion. They amount of motion in the video may correspond to bandwidth demands, and thus to how wireless signal 431 is configured. Initially, a predicted or known video profile may be selected that can be used to initially configure signals.

Media system 411 may then identify a suitable wireless configuration for wirelessly exchanging video between media system 411 and display system 413 based on the environment information, the schedule information, and the video profile (step 707). The wireless configuration arrived at by media system 411 may be selected so as to avoid or reduce interference caused by any of the local participants, equipment in the room, or other characteristics of conference environment 401. The wireless configuration may also be selected so as to avoid causing interference with respect to communications occurring in other conference environments, such as conference environment 407. In addition, the wireless configuration may be selected to achieve an appropriate amount of bandwidth or throughput while balancing quality issues potentially related to the video profile.

For example, any or all of the shape, the power level, and the direction of wireless signal 431 transmitted by media system 411 and carrying video 421 may be determined to avoid or mitigate interference within or external to conference environment 401. To avoid interference, media system 411 may determine to direct a wireless signal away from occupied environments or interference causing objects. This may be accomplished in a number of ways, such as simply blocking a portion of the wireless signal, shaping the wireless signal, or in some other suitable manner. The power of wireless signal 431 may also be adjusted to avoid or mitigate interference. However, any or all of the shape, signal, power, and direction of wireless signal 431 may also be determined based on the video profile for video 421.

In particular, video with a great deal of motion is typically difficult to compress relative to video that lacks much motion and requires greater bandwidth to ensure proper transmission. But throughput may vary considerably depending upon the shape, power level, or direction of a wireless signal. A balance may therefore be attempted between avoiding the negative effects of interference with other signals and environments and achieving sufficient throughput between media system 411 and display system 413. The shape, direction, and power level of wireless signal 431, as defined by its wireless configuration, can be determined with all three factors considered.

Upon identifying a configuration for wireless signal 431, media system 411 transmits wireless signal 431 to display system 413. In the implementation illustrated in FIG. 4, wireless signal 431 is directed away from conference environment 407, which is occupied, and toward conference environment 403, which is empty. This is to avoid or at least mitigate interference with wireless signal 437 generated by media system 419 and to avoid any interference that may arise from the position of the local participants in conference environment 401. The direction of wireless signal 431 in FIG. 4 is provided merely for illustrative purposes and may be exaggerated or different relative to how a wireless signal may actually be directed. In this implementation, directing wireless signal 431 towards conference environment 403 allows it to bounce or otherwise be redirected off a wall or some other structure so that a sufficient amount of its energy reaches display system 413. While not shown, the power level, direction, and other characteristics of wireless signal 431 may also be sufficient in view of the video profile for video 421. Display system 413 then processes the wireless signal so as to display video 421.

Upon identifying a configuration and commencing with the transmission of video, media system 411 monitors for changes to the interference profile of the video conference (step 709). A variety of changes may occur, such as the repositioning of participants within conference environment 401, the cessation of a conference in an adjacent environment, the launch of a new conference in an adjacent environment, or any other change that may add to or detract from the potential for interference.

In the event that changes have occurred with respect to the interference profile, the configuration of wireless signal 431 and possibly wireless signal 435 may be changed (return to step 707). For example, a reduction in the potential for interference can lead to a change in the configuration of the wireless signals. Conversely, an increase in the potential for interference can lead to yet another change in the configuration of the wireless signals.

Media system 411 may also monitor for changes to the video profile (step 711). This may occur independently of monitoring the interference profile, or it may occur in response to no changes being found with respect to the interference profile. In the event that the video profile has changed, the configuration of wireless signal 431 and possibly wireless signal 435 may be changed (return to step 707). In the event that no changes have occurred with respect to the video profile, and if no changes have occurred with respect to the interference profile, media system continues to transmit in accordance with no changes made to the wireless configuration (step 713).

Figure 5:
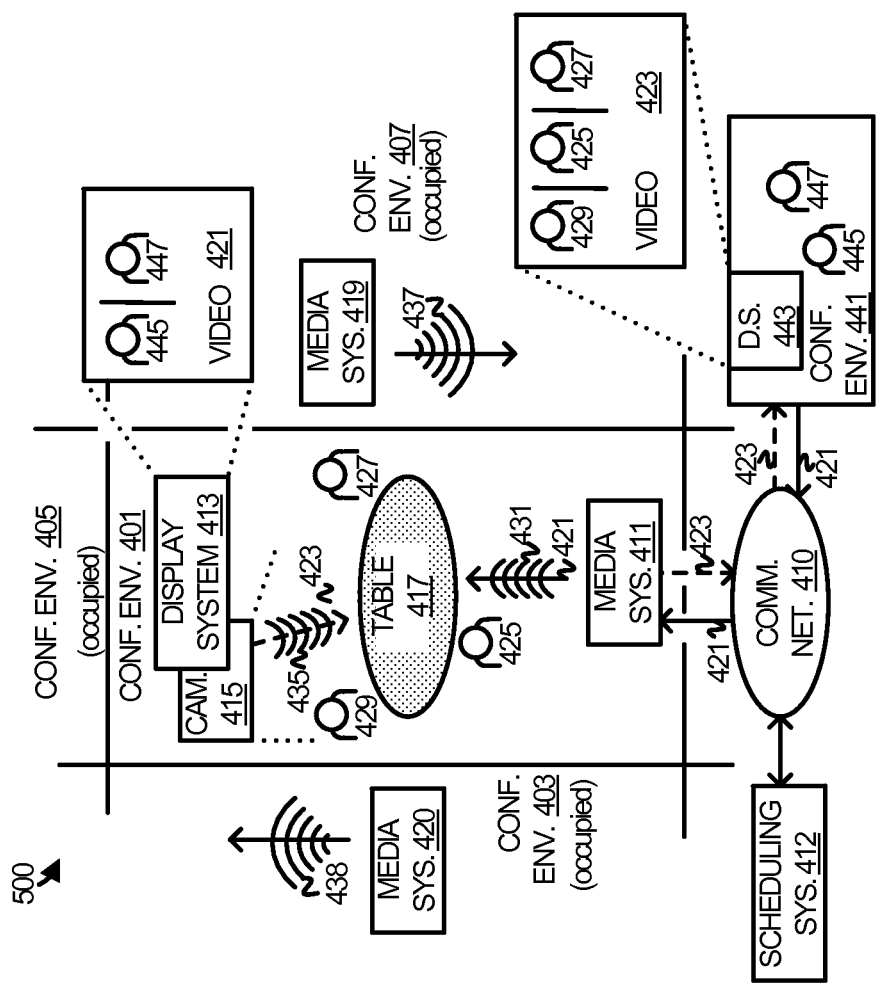
FIG. 5 illustrates a conference architecture in an implementation.

Other scenarios may include shaping the wireless signal so that all or most of the signal avoids the object or objects causing interference. One such situation is illustrated in FIG. 5. FIG. 5 illustrates conference architecture 500 which includes the same elements as conference architecture 400 illustrated in FIG. 4 with the addition of media system 420 and wireless signal 438. In addition, the local participants and table 417 are arranged differently.

In this scenario, wireless signal 431 is shaped or beamformed such that it avoids interference with some of the local participants. In addition, beam-forming wireless signal 431 limits how much, if any, of its energy may escape to conference environment 407 and conference environment 403. In this manner, interference with wireless signal 438 may be avoided or mitigated, as well as interference with wireless signal 437. The shape of wireless signal 431 in FIG. 5 is provided merely for illustrative purposes and may be exaggerated or different relative to how a wireless signal may actually be shaped or formed.

Wireless signal 435 carrying video 423 may also be configured based on the schedule of the surrounding environment and physical characteristics of conference environment 401. In this implementation the shape of wireless signal 435 is such that most of its energy is directly at media system 411, thereby mitigating how much energy may escape to conference environment 403 and potentially interfere with wireless signal 438. In addition, beam-forming wireless signal 435 may also mitigate how much energy may potentially leak into conference environment 407 and interfere with wireless signal 437. Referring briefly to FIG. 4, wireless signal 435 may be neither particularly directed nor particularly shaped since its line of sight to media system 411 is relatively unobstructed, although other characteristics, such as power, may be adjusted if desired.

It may be appreciated that wireless configuration process 600 may also be carried out by any other media system in place of or in addition to media system 411. For example, media system 419 could employ wireless configuration process 600 to reduce the likelihood that wireless signal 437, or other signals within conference environment 407, cause interference or otherwise reduce the quality of video conferencing in other conference environments. Media system 420 could employ wireless configuration process 600 to reduce the likelihood that wireless signal 438, or other signals within conference environment 403, cause interference or otherwise reduce the quality of video conferencing in other conference environments.

Various technical aspects may be appreciated from the present discussion. For example, potential interference caused by or encountered when wirelessly transmitting high definition video can be avoided or mitigated by configuring wireless signals in view of physical characteristics of an environment and in view of the schedules associated with a surrounding environment, such whether or not an adjacent conference room is scheduled. Other aspects include the ability to monitor the video profile of video associated with a conference and consider the video profile when configuring wireless signals. In this manner, the quality of a video presentation may be maintained when while adjusting the configuration of a given wireless signal to avoid or mitigate interference.

Various other aspects may be appreciated from the following operational scenario. A typical conference environment, such as a tele-presence room, may have multiple video fees to emulate real, in-person meetings. Such a room may have one or even multiple video displays and one or even multiple cameras. Installing all of the wiring to accommodate such an arrangement can be very expensive and time consuming, especially with respect to retrofitting rooms. Rather than wiring the room, wireless communication technologies may be leveraged However, in many cases multiple tele-presence rooms or other similar conference environments may be located adjacent to or at least nearby each other such that wireless transmissions originating in one may cause interference with respect to wireless transmissions occurring in another. By employing any of the systems and processes above, such interference may be avoided or at least mitigated to some extent.

In some implementations, Gigabit wireless technologies covered under various 802.11 standards may be used to exchange video wirelessly between media systems in a conference room. In some implementations it may be suitable to leverage ultra wide-band (UWB) wireless technologies when transmitting video wirelessly within a conference room. Such technologies allow for high through-put transmissions that tend to have a limited travel distance relative to other technologies. Orthogonal Frequency Division Multiple Access (OFDMA) is a digital modulation scheme that may also be employed with respect to the wireless exchange of video.

Figure 8:
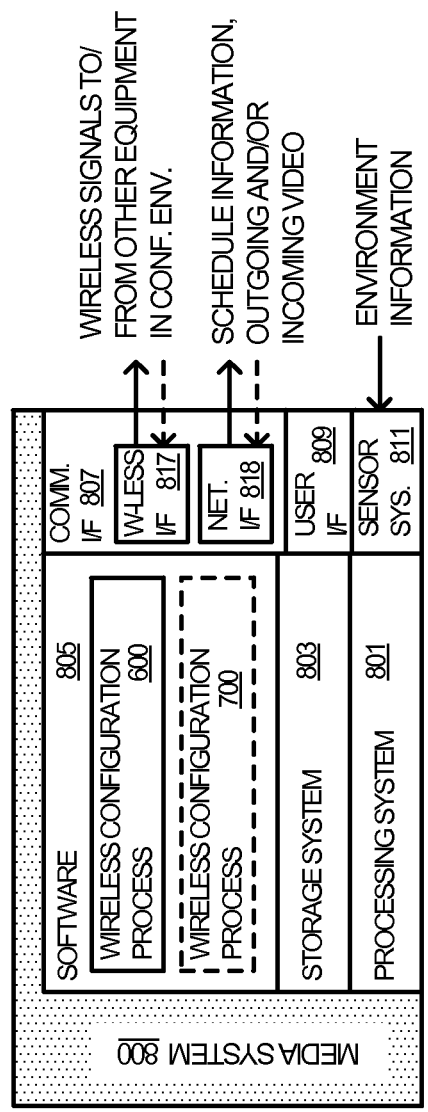
FIG. 8 illustrates a media system in an implementation.

FIG. 8 illustrates media system 800, which is representative of any computing apparatus, system, or collection of systems suitable for implementing any of the media systems illustrated in FIG. 1 or FIG. 4. Examples of media system 800 include general purpose computers, desktop computers, laptop computers, routers, wireless gateways, or any other type of suitable computing system, combinations of systems, or variations thereof.

Media system 800 includes processing system 801, storage system 803, software 805, communication interface 807, user interface 809, and sensor system 811. User interface 809 and sensor system 811 are optional. Processing system 801 is operatively coupled with storage system 803, communication interface 807, and user interface 809. Processing system 801 loads and executes software 805 from storage system 803. When executed by media system 800 in general, and processing system 801 in particular, software 805 directs media system 800 to operate as described herein for wireless configuration process 600 or wireless configuration process 700, as well as any variations thereof. Media system 800 may optionally include additional devices, features, or functionality not discussed here for purposes of brevity.

Referring still to FIG. 8, processing system 801 may comprise a microprocessor and other circuitry that retrieves and executes software 805 from storage system 803. Processing system 801 may be implemented within a single processing device but may also be distributed across multiple processing devices or sub-systems that cooperate in executing program instructions. Examples of processing system 801 include general purpose central processing units, application specific processors, and logic devices, as well as any other type of processing device, combinations, or variations thereof.

Storage system 803 may comprise any computer readable storage media readable by processing system 801 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal. In addition to storage media, in some implementations storage system 803 may also include communication media over which software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 801.

Software 805 may be implemented in program instructions and among other functions may, when executed by media system 800 in general or processing system 801 in particular, direct media system 800 or processing system 801 to operate as described herein for wireless configuration process 600 and wireless configuration process 700. Software 805 may include additional processes, programs, or components, such as operating system software or other application software. Software 805 may also comprise firmware or some other form of machine-readable processing instructions executable by processing system 801.

In general, software 805 may, when loaded into processing system 801 and executed, transform media system 800 overall from a general-purpose computing system into a special-purpose computing system customized to facilitate wireless conference environments as described herein for each implementation. Indeed, encoding software 805 on storage system 803 may transform the physical structure of storage system 803. The specific transformation of the physical structure may depend on various factors in different implementations of this description. Examples of such factors may include, but are not limited to the technology used to implement the storage media of storage system 803 and whether the computer-storage media are characterized as primary or secondary storage.

For example, if the computer-storage media are implemented as semiconductor-based memory, software 805 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that media system 800 is generally intended to represent a computing system with which software 805 is deployed and executed in order to implement wireless configuration process 600 or wireless configuration process 700 (and variations thereof). However, media system 800 may also represent any computing system on which software 805 may be staged and from where software 805 may be distributed, transported, downloaded, or otherwise provided to yet another computing system for deployment and execution, or yet additional distribution.

Referring again to at least FIG. 4 and FIG. 5, through the operation of media system 800 employing software 805, transformations may be performed with respect to conference architecture 400 and conference architecture 500. As an example, wireless signal 431 could be considered transformed from one state to another when subject to wireless configuration process 600 or wireless configuration process 700. In a first state, wireless signal 431 is transmitting in accordance with an initial configuration. In a second state, changes in the interference profile or possibly the video profile may result in a new configuration for wireless signal 431, changing conference environment 401 to a different state.

Referring again to FIG. 8, communication interface 807 may include communication connections and devices that allow for communication between media system 800 and other computing systems (not shown) over a communication network or collection of networks (not shown) or the air. In particular, communication interface 807 includes wireless interface 817 to communicating wirelessly over the air with other elements, such as a display system or a camera. For example, wireless interface 817 may transmit wireless signals carrying video for a video conference to other equipment within a conference environment that displays the video, such as a video monitor. In some scenarios wireless interface 817 may also receive wireless signals carrying other video, such as video captured of a local scene within the conference environment.

Communication interface 807 also includes network interface 818 for communicating with other elements, such as a scheduling system and possibly a remote media system, over the Internet, local area network, or some other communication network or combinations thereof. For example, network interface 818 may communicate with a scheduling server (not shown) to obtain scheduling information related to the occupancy of other rooms in a surrounding environment. Network interface 818 may also communicate with an external video source, such as a remote media system, to receive incoming video that is then transmitted wirelessly by wireless interface 817. Network interface 818 may also be capable of taking video received by wireless interface 817 and communicating it as outgoing video to a remote system for display to people participating remotely in a video conference.

Network interface 818 may communicate over wired or wireless links. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media.

The aforementioned communication media, network, connections, and devices are well known and need not be discussed at length here. However, it may be appreciated that wireless interface 817 may include equipment capable of beam forming and controlling the direction of a wireless signal, such as one or more directional antennas and associated transmission equipment. Directional or beam antennas radiate greater power in one or more directions allowing for greater performance on transmit and receive and possibly reduced interference. In general, wireless interface 817 may be capable of adjusting the gain, beam-width, and direction of a signal, either separately or in combination with each other, as described above for the various embodiments.

User interface 809, which is optional, may include a mouse, a keyboard, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 809. The aforementioned user interface components are well known and need not be discussed at length here.

Sensor system 811, which is also optional, may include sensor equipment capable of detecting the presence of objects within a conference environment. In some implementations sensor system 811 may be capable of analyzing a room in three dimensions. An example of sensor system 811 is the Kinect® system from Microsoft®. Other examples include infrared detectors, acoustic sensors, video analytics modules, or any variation or combination thereof. Sensor system 811 may be capable of scanning a conference environment to obtain environment information, such as images of a room, and processing the environment information to arrive at physical characteristics of the room. As mentioned above, some physical characteristics include the presence of objects and their location such that they may potentially interfere with a wireless signal.

It may be appreciated that such environment information could be obtained without the aid or in addition to the aid of sensory system 811, such as by consulting layout information or other pre-existing sources of environment information. It may also be appreciated that sensor system 811 could be integrated with media system 800 but could also be provided as a stand-alone system. Still other ways in which to obtain environment information include processing video captured by other devices separate from media system 800, such as video captured by a camera located within a conference environment.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. One or more computer readable storage media having program instructions stored therein for facilitating wireless conference environments that, when executed by a processing system, direct the processing system to at least:
   obtain environment information comprising a physical characteristic of a conference environment in which to host a least a portion of a video conference;
   obtain schedule information comprising a schedule for a portion of a surrounding environment associated with the conference environment; and
   identify a wireless configuration in accordance with which to wirelessly exchange video between a plurality of media systems engaged in the video conference based at least in part on the physical characteristic of the conference environment and the schedule for the portion of the surrounding environment in order to reduce interference associated with the physical characteristic and to reduce other interference implied by the schedule.

2. The one or more computer readable storage media of claim 1 wherein the plurality of media systems comprises a first media system and a second media system, wherein the video comprises first video captured of a first scene, and wherein the wireless configuration comprises a protocol, a shape, a direction, and a power level for a first wireless signal that carries the first video from the first media system to the second media system.

3. The one or more computer readable storage media of claim 2 wherein to identify the wireless configuration the program instructions direct the processing system to select at least one of the protocol, the shape, the direction, and the power level for the first wireless signal in order to reduce the wireless interference associated with the physical characteristic and to reduce other wireless interference implied by the schedule.

4. The one or more computer readable storage media of claim 3 wherein the plurality of media systems comprises a third media system, wherein the video further comprises second video captured by the third media system of a second scene, and wherein the wireless configuration comprises a protocol, a shape, a direction, and a power level for a second wireless signal that carries the second video from the third media system to the first media system.

5. The one or more computer readable storage media of claim 4 wherein to identify the wireless configuration the program instructions direct the processing system to select at least one of the protocol, the shape, the direction, and the power level for the second wireless signal in order to reduce the wireless interference associated with the physical characteristic, the other wireless interference implied by the schedule for the portion of the surrounding environment, and additional wireless interference associated with the first wireless signal.

6. The one or more computer readable storage media of claim 1 wherein to obtain the environment information the program instructions direct the processing system to analyze at least a portion of the video to detect a presence of any objects in the conference environment having a potential to interfere with the video wirelessly exchanged between the plurality of media systems and wherein the physical characteristic of the conference environment comprises the presence of at least one of the objects.

7. The one or more computer readable storage media of claim 6 wherein the conference environment comprises a conference room and the portion of the surrounding environment comprises another conference room in which another video conference is hosted concurrently with the video conference as identified by the schedule.

8. A method for facilitating wireless conference environments, the method comprising:
   obtaining environment information comprising a physical characteristic of a conference environment in which to host a least a portion of a video conference;
   obtaining schedule information comprising a schedule for a portion of a surrounding environment associated with the conference environment; and
   identifying a wireless configuration in accordance with which to wirelessly exchange video between a plurality of media systems engaged in the video conference based at least in part on the physical characteristic of the conference environment and the schedule for the portion of the surrounding environment to reduce interference associated with the physical characteristic and to reduce other interference implied by the schedule.

9. The method of claim 8 wherein the plurality of media systems comprises a first media system and a second media system, wherein the video comprises first video captured of a first scene, and wherein the method further comprises transmitting the first video in a first wireless signal from the first media system in accordance with the wireless configuration to the second media system.

10. The method of claim 9 wherein the wireless configuration comprises a protocol, a shape, a direction, and a power level for the first wireless signal, and wherein identifying the wireless configuration comprises selecting the protocol, the shape, the direction, and the power level for the first wireless signal to reduce the wireless interference associated with the physical characteristic and to reduce other wireless interference implied by the schedule.

11. The method of claim 10 further comprising displaying the first video on the second media system, wherein the plurality of media systems comprises a third media system, wherein the video further comprises second video captured by the third media system of a second scene, and wherein the method further comprises transmitting the second video in a second wireless signal from the third media system in accordance with the wireless configuration to the first wireless system.

12. The method of claim 11 wherein the wireless configuration comprises a protocol, a shape, a direction, and a power level for the second wireless signal, and wherein identifying the wireless configuration comprises selecting the protocol, the shape, the direction, and the power level for the second wireless signal to reduce the wireless interference associated with the physical characteristic, to reduce the other wireless interference implied by the schedule for the portion of the surrounding environment, and to reduce additional wireless interference associated with the first wireless signal.

13. The method of claim 8 wherein obtaining the environment information comprises analyzing at least a portion of the video to detect a presence of any objects in the conference environment having a potential to interfere with the video wirelessly exchanged between the plurality of media systems and wherein the physical characteristic of the conference environment comprises the presence of at least one of the objects.

14. The method of claim 13 wherein the conference environment comprises a conference room and the portion of the surrounding environment comprises another conference room in which another video conference is hosted concurrently with the video conference as identified by the schedule.

15. A media system comprising:
a network interface configured to receive first video captured by a first media system of a first portion of a video conference;
a processing system configured to at least:
obtain environment information comprising a physical characteristic of a conference environment in which to host a second portion the video conference;
obtain schedule information comprising a schedule for a portion of a surrounding environment associated with the conference environment; and
identify a wireless configuration in accordance with which to wirelessly transmit the first video of the first portion of the video conference in a first wireless signal based at least in part on the physical characteristic of the conference environment and the schedule for the portion of the surrounding environment; and
a wireless interface configured to transmit the first wireless signal in accordance with the wireless configuration to at least a second media system.

16. The media system of claim 15 wherein the wireless interface receives a second wireless signal comprising second video captured by the second media system of the second portion of the video conference and the network interface communicates the second video to the first media system.

17. The media system of claim 16 wherein the wireless configuration comprises at least one of a protocol, a shape, a direction, and a power level for the first wireless signal selected in order to reduce wireless interference associated with the physical characteristic and to reduce other wireless interference implied by the schedule.

18. The media system of claim 17 wherein the wireless configuration further comprises at least one of a protocol, a shape, a direction, and a power level for second first wireless signal selected in order to reduce the wireless interference associated with the physical characteristic, the other wireless interference implied by the schedule, and additional interference associated with the first wireless signal.

19. The media system of claim 15 wherein to obtain the environment information the processing system monitors for a presence of any objects in the conference environment having a potential to interfere with wireless signals and wherein the physical characteristic of the conference environment comprises the presence of at least one of the objects.

20. The media system of claim 19 wherein the conference environment comprises a conference room and the portion of the surrounding environment comprises another conference room in which another video conference is hosted concurrently with the video conference as identified by the schedule.

* * * * *